June 14, 1938. H. C. THOMPSON Re. 20,762
FLOOR WAXING DEVICE
Original Filed Sept. 30, 1935
Fig. 2.
Fig. 1.
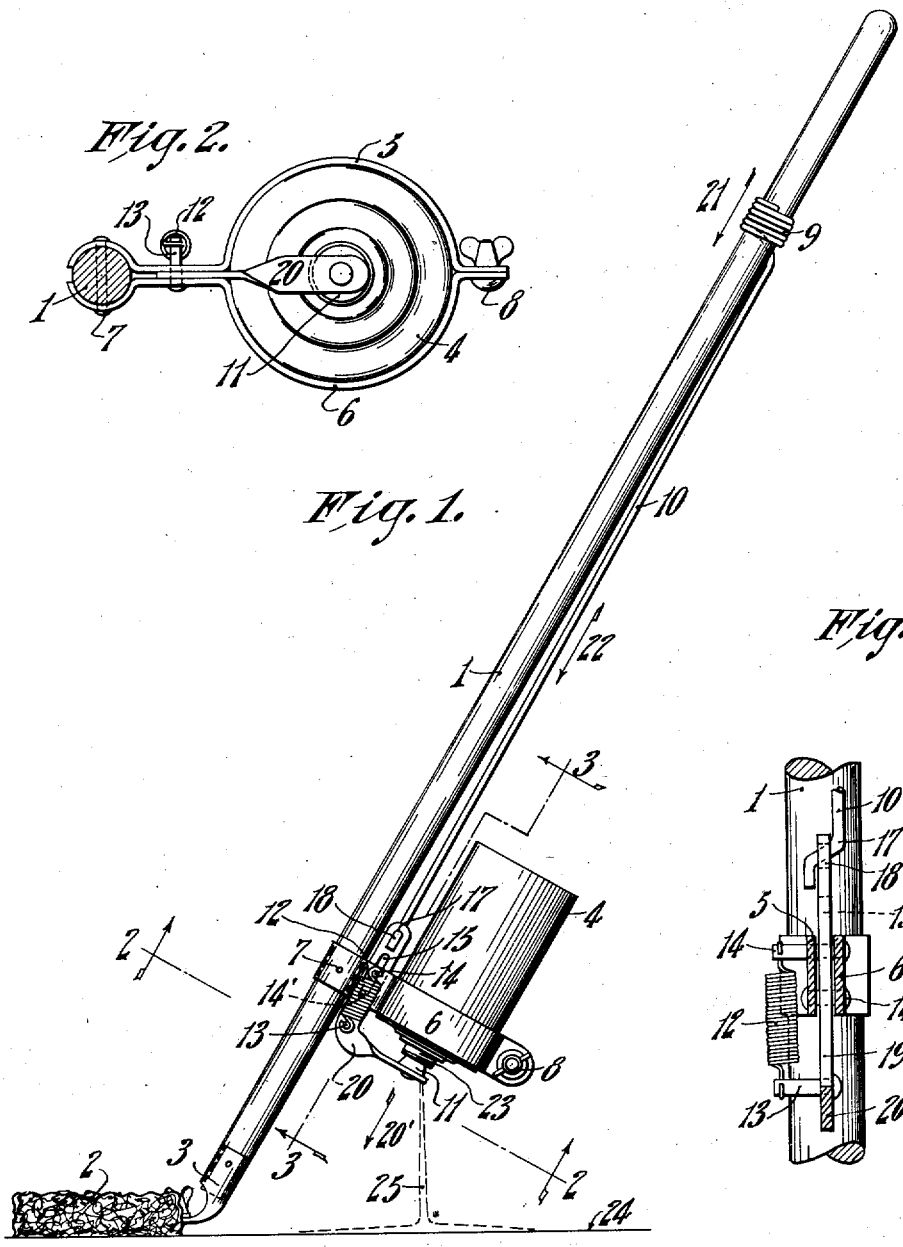
Fig. 3.
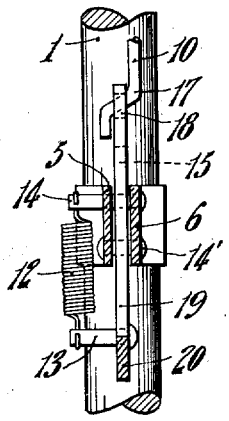
INVENTOR,
*Henry C. Thompson,*
BY
*Harry W. Bowen,*
ATTORNEY.

Reissued June 14, 1938

Re. 20,762

UNITED STATES PATENT OFFICE 20,762

FLOOR WAXING DEVICE

Henry C. Thompson, Holyoke, Mass.

Original No. 2,061,216, dated November 17, 1936, Serial No. 42,801, September 30, 1935. Application for reissue January 5, 1938, Serial No. 183,561

4 Claims. (Cl. 91—25)

My invention relates to improvements in floor waxing devices.

An object of my invention is to provide means, in combination and co-operation with a polishing device, such as a dry mop, broom, weighted wax polisher, or the like, for applying the waxing substance, to the surface to be treated and located in close proximity to the working part of the waxing device.

A further object of my invention is to provide a container for the liquid waxing substance, means for securing the container to and supporting the same on a handle member of a dry mop, or the like, and means movably supported on the device, or similar article, for opening and closing the discharge orifice of the container for depositing any desired amount of the waxing substance on the surface to be treated.

These and other objects and advantages of my invention will be more completely brought forth and described in the specification, the accompanying drawing, and the appended claims.

A preferred embodiment of my invention is illustrated in the accompanying drawing, as it is used in cooperation with a dry mop, but I do not confine myself to this combination, as it will be readily undertsood that my device may be easily and quickly attached to any utensil or floor tool having the usual broom handle.

In the drawing:—

Fig. 1 is an elevational view of a dry mop with my device secured to the handle member;

Fig. 2 is an underside plan view, partially in section on the line 2—2 of Fig. 1; and Fig. 3 is a sectional view on the line 3—3 of Fig. 1.

Referring now to the drawing in detail, in which like numerals refer to like parts throughout:—

1 indicates the handle member of the waxing apparatus to the lower end of which is attached the waxing pad 2, by means of the member 3. 4 indicates a can, or suitable receptacle, for containing the liquid waxing material. This receptacle is secured to the handle member, by means of the clamping members 5 and 6, as shown in Figs. 1 and 2, the two portions of which members pass around the handle 1 and are secured in place by means of the pin 7. Their opposite ends are secured together with the thumb nut 8. Located on the handle 1 is a slidable member 9, composed of coiled wire, which extends downward, as shown at 10, as a rod for opening and closing the valve or stopper member 11, at the lower end of the container 4 as shown. This valve, or stopper, is normally retained in its closed or upward position by means of the contractile spring 12, one end of which is attached to the pin 13 that is located on the stopper supporting arm 20, and its other end is connected to the pin 14 which is secured to the clamps 5 and 6. 15 indicates a slot in the slidable plate 19 in which the pin 14 is located. 14′ is a guide pin.

The lower end of the rod 10 is formed with an angular, or bent portion 17 which passes through an opening 18 in the slidable member 19. This member is formed with the bent portion 20 on which the stopper 11 is mounted.

In operation, when the operator moves the coiled bearing member 9 on the handle downward as shown by the arrows 21 and 22, the stopper 11 will be moved downward away from the discharge end 23 of the container 4 whereby the liquid contents will fall onto the floor surface 24 as indicated by the dotted line 25. The operator now releases his hold on the slidable member 9 permitting the coiled spring 12 to move the stopper upward into its closed position as shown in Fig. 1. Next, he moves the waxing pad 2 along on the surface of the floor to be waxed, which may be a linoleum, or a waxed, or varnished floor, thus spreading the waxing material evenly on the surface 24. The downward movement of the stopper 11 is indicated by the arrow 20′.

It will be seen, from this description, that I have provided a very convenient and easily operated apparatus for waxing a floor. It is, of course, obvious that when one portion of the floor has been waxed, the operation will be repeated on another portion of the floor, until the waxing operation is completed.

What I claim is:—

1. In combination, in a floor waxing apparatus, a handle member, a waxing pad attached thereto, a receptacle for containing a waxing liquid, clamping means for securing the receptacle to the handle, the receptacle having a wax discharge orifice or opening, a stopper or closure member for normally closing the orifice, a coiled slidable part located on the handle and connected to the stopper member, and means for normally retaining the stopper in its closed position, said means comprising a movable slotted plate, a guiding pin located in the slot of the movable plate, said plate being connected to the said slidable part located on the handle, a spring, one end of which is connected to the stopper supporting member and its other end attached to the handle member, whereby the action of the spring serves to normally retain the stopper in its closed position.

2. In a device for the purpose described, a waxing pad, a handle member to which the pad is attached, a receptacle for containing a waxing fluid having a discharge orifice at one end, a clamping member having spaced portions for removably securing the receptacle to the handle with its discharge orifice located on the lower side, a closure operating device for the orifice comprising a rod having one end coiled around the handle, its lower, or opposite end, formed with a bend which passes through a slidable part in the spaced portions of the clamping member, the slidable part supporting an angular-shaped closure member for the orifice of the receptacle, a spring attached to the said closure-supporting member and the receptacle clamping member, whereby the orifice is normally closed, and whereby when the coil part around the handle is pushed downward, the stopper will be moved away from the orifice and the wax contents discharged onto the floor adjacent the pad as described.

3. In combination, in a floor waxing apparatus, a handle member, a waxing pad attached thereto, a receptacle for containing waxing liquid, clamping means securing the receptacle to the handle, the receptacle having a discharge orifice, a plate member slidable relative to the clamping means in substantial parallelism with the handle, a stopper for normally closing the orifice, a member extending along the handle having its upper end slidably guided on the handle and its lower end connected to the plate member, and a spring urging the plate in a direction to bring the stopper into orifice closing position, all adapted and arranged whereby the stopper may be moved towards and away from the orifice in a substantially straight line.

4. In combination, in a floor waxing apparatus, an elongated handle member, a waxing pad attached to the lower end thereof, a receptacle for containing waxing liquid having a discharge orifice, clamping means securing the receptacle to the handle, a stopper for closing the orifice, and means for moving said stopper towards and away from said orifice, including a plate member to which said stopper is attached slidably mounted relative to said clamping means and handle, a rod member having an upper end slidably mounted on the handle and its lower end connected to said plate member, and a spring urging said plate member upwardly, all adapted and arranged whereby the rod member and plate may be moved downwardly in substantial parallelism with the handle against the action of the spring to move the stopper away from and in alignment with the orifice.

HENRY C. THOMPSON.